United States Patent

Paolillo et al.

(10) Patent No.: US 7,328,852 B2
(45) Date of Patent: Feb. 12, 2008

(54) METHOD AND DEVICE FOR ESTIMATING THE AIR DISCHARGE TEMPERATURE OF A HEAT EXCHANGER

(75) Inventors: Giorgio Paolillo, Milan (IT); Julien Quilliard, Metz (FR)

(73) Assignee: Delphi Technologies, Inc., Troy, MI (US)

( * ) Notice: Subject to any disclaimer, the term of this patent is extended or adjusted under 35 U.S.C. 154(b) by 312 days.

(21) Appl. No.: 10/818,739

(22) Filed: Apr. 6, 2004

(65) Prior Publication Data

US 2004/0231824 A1   Nov. 25, 2004

(30) Foreign Application Priority Data

May 6, 2003   (EP)   ................................. 03101246

(51) Int. Cl.
B60H 1/02   (2006.01)

(52) U.S. Cl. ........................ 237/12.3 B; 237/12.3 R; 165/41; 165/42

(58) Field of Classification Search ........... 237/12.3 B, 237/12.3 R, 2 A; 165/41, 42; 123/142.5 E
See application file for complete search history.

(56) References Cited

U.S. PATENT DOCUMENTS 6,123,146 A * 9/2000 Dias ........................... 165/202
6,192,698 B1 * 2/2001 Kakehashi et al. ............ 62/227
6,330,909 B1 * 12/2001 Takahashi et al. ........... 165/202
6,454,180 B2 * 9/2002 Matsunaga et al. ..... 237/12.3 B
6,659,358 B2 * 12/2003 Kamiya et al. ............. 236/49.3
6,688,120 B2 * 2/2004 Aoki et al. .................... 62/133
6,712,280 B2 * 3/2004 Pawlak et al. .............. 236/49.3
6,732,941 B2 * 5/2004 Homan et al. .......... 237/12.3 B
6,761,037 B2 * 7/2004 Tsuboi et al. ................. 62/244
6,820,436 B2 * 11/2004 Tomita et al. .............. 62/228.1
6,892,808 B2 * 5/2005 Remond et al. ............. 165/203

FOREIGN PATENT DOCUMENTS

DE    4214686    11/1993
EP    0876930    11/1998
EP    0989002    3/2000

* cited by examiner

*Primary Examiner*—Derek S. Boles
(74) *Attorney, Agent, or Firm*—Patrick M. Griffin

(57) ABSTRACT

The invention relates to a method for estimating a heater-core air discharge temperature of an HVAC system. According to the invention, the method uses a model of the heat exchanger. This heat exchanger efficiency model maps a heat exchanger efficiency to a set of actual operating parameters by generating a heat exchanger efficiency coefficient based on said second set of actual operating parameters.

1 Claim, 2 Drawing Sheets

US 7,328,852 B2

METHOD AND DEVICE FOR ESTIMATING THE AIR DISCHARGE TEMPERATURE OF A HEAT EXCHANGER

FIELD OF THE INVENTION

The present invention generally relates to a method and a device for estimating the air discharge temperature of a heat exchanger. More specifically, the present invention relates to a method and a device for estimating the heater-core air discharge temperature of an HVAC system.

BACKGROUND OF THE INVENTION

An automotive heating, ventilation, and air conditioning (HVAC) system usually comprises an evaporator for cooling air and a heater-core for heating air. The heater-core is designed to transfer heat from the coolant of a vehicle's engine to the passenger compartment air in order to warm the passengers and defog or de-ice the windows of the vehicle. The warm air flow from the heater-core is mixed with a cold air flow from the evaporator and discharged through vents into the compartment of the vehicle.

The temperature of the discharged air can be controlled by various systems. One kind of these systems applies an open loop algorithm in order to control the position of blend doors, which control the air flows in the HVAC system and are located in air ducts of the HVAC system. In such open loop control systems, data about the temperature of the air flow leaving the heater-core (in the following also called heater-core air discharge temperature) and or the evaporator (in the following also called evaporator air discharge temperature) is important in order to estimate the air discharge temperature of the HVAC system.

In existing systems, the heater-core air discharge temperature is e.g. obtained by a direct temperature measurement using a temperature sensor. However, a temperature sensor increases the overall costs of the HVAC system. According to another solution, the heater-core air discharge temperature is roughly estimated based on the temperature of the coolant. This solution is shown in FIG. 3. The coolant temperature 100 is supplied to a low pass filter 102 as a measurement signal, preferably on a CAN bus. The low pass filter 102 maps the heater-core air discharge temperature 104 in function of the coolant temperature. This solution has the disadvantage that the accuracy of calibration over a wide range of operating conditions of the HVAC system is poor, particularly since the heater-core air discharge temperature depends on a plurality of parameters and not only on the coolant temperature.

SUMMARY OF THE INVENTION

It is an object of the present invention to provide a method and a device for estimating the heat exchanger air discharge temperature of an HVAC system, wherein the estimation of the air discharge temperature has a high accuracy and can be performed at low costs.

This object is achieved by a method for estimating an heat exchanger air discharge temperature of an HVAC system as claimed in claim 1 and a device for estimating the heat exchanger air discharge temperature of an HVAC system as claimed in claim 10.

The present invention relates to a method and a device for estimating the heat exchanger air discharge temperature of an HVAC system. In particular, the invention relates to a method and a device for estimating the heat exchanger air discharge temperature of an automotive HVAC system that uses a model of the heat exchanger. This heat exchanger efficiency model maps a heat exchanger efficiency to a set of actual operating parameters by generating a heat exchanger efficiency coefficient based on said second set of actual operating parameters. It follows that the method of the present invention increases the accuracy of the estimated heat exchanger discharge temperature by taking into account an efficiency of the heat exchanger at actual operating conditions. Hence a very high accuracy of calibration over a wide range of operating conditions of the HVAC system may be achieved.

In a preferred embodiment of the invention, the second set of actual operating parameters comprises a coolant mass flow and an air flow through the heater-core. These parameters, which are used in the generation of the heat exchanger efficiency coefficient or coefficients, are already present in the HVAC module or can be calculated based on other parameters, which are already present in the HVAC system. The advantage of this embodiment of the present invention is to provide a method to estimate the heat exchanger air discharge temperature, which does not require the usage of any additional sensors. Therefore, the invention can be implemented at low costs. Furthermore, the method according to the invention is reliable, since it does not employ sensors, harness, and electrical connections of the sensors. Finally, the method according to the invention is more accurate than the methods known from prior art, since the estimation of the heater-core air discharge temperature is based not only on a single parameter but on a plurality of parameters.

In a preferred embodiment, the coolant mass flow is calculated based on the speed of an engine comprising the coolant. Alternatively or additionally, it is preferred to base the calculation of the coolant mass flow on the type of an engine comprising the coolant.

In an advantageous embodiment of the invention, said first set of actual operating parameters comprises a coolant temperature of a coolant flowing through said heat exchanger and/or an inlet temperature of an air flow to be conditioned by said heat exchanger. These parameters are already present in the HVAC module and hence no additional sensors are required.

In a preferred embodiment, a heater-core heat exchange effectiveness is calculated based on the coolant mass flow and the air flow through the heater core. The heat exchange effectiveness is a single parameter characterising the heater-core and can be used together with other parameters of the HVAC system for precisely calculating and estimating the heater-core air discharge temperature.

Particularly, the heater-core air discharge temperature may be estimated based on the heater-core heat exchange effectiveness, an air discharge temperature of an evaporator of the HVAC system, and an initial temperature differential between the temperature of the coolant and the evaporator air discharge temperature. Alternatively or additionally, the heater-core air discharge temperature is estimated based on the heater-core heat exchange effectiveness, an air inlet temperature of an air flow to be conditioned and a coolant temperature of a coolant flowing through said heat exchanger.

According to a further aspect of the invention, a device for estimating a heater-core air discharge temperature of an HVAC system based on a first set of actual operating parameters is provided. The device is adapted to implement the method according to the invention and comprises first calculation means which are adapted to calculate an heat exchanger efficiency based on a second set of actual operating parameters. Said second set of actual operating parameters may e.g. comprise a coolant mass flow and/or an air flow through the heater-core.

In a first preferred embodiment, the device comprises second calculation means adapted to calculate the coolant mass flow based on the speed of an engine comprising the coolant.

In a second preferred embodiment, the device comprises third calculation means adapted to calculate the coolant mass flow based on the type of an engine comprising the coolant.

The device may further comprise fifth calculation means adapted to estimate the heater-core air discharge temperature based on the heater-core heat exchange effectiveness, an air inlet temperature, and an temperature of the coolant.

In order to employ the device in modern automotive applications, it may comprise a CAN interface, capable of receiving signals from a CAN bus connected to the CAN interface.

Preferably, the device is part of an HVAC control device, which comprises memory means storing a computer program adapted to implement the device for estimating an heater-core air discharge temperature and processing means adapted to execute the computer program, to process received signals, and to generate an heater-core air discharge temperature signal.

BRIEF DESCRIPTION OF THE DRAWINGS

The present invention will now be described, by way of example, with reference to the accompanying drawings, in which.

DETAILED DESCRIPTION OF PREFERRED EMBODIMENTS

Preferred embodiments of a device and a method for estimating the air discharge temperature of a heater-core of an HVAC system in accordance with the invention will now be described.

Figure 1:
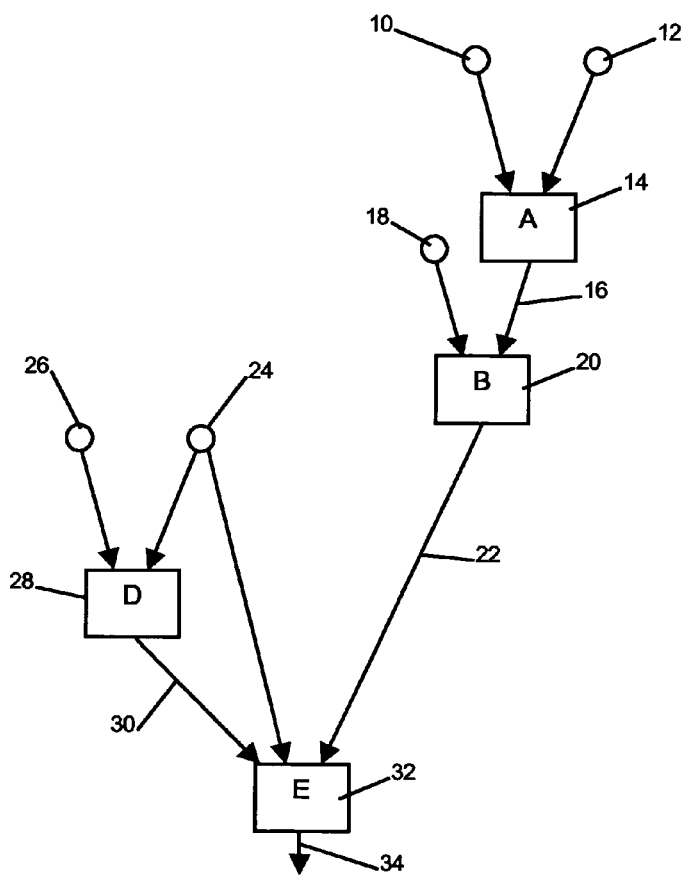
FIG. 1 shows a block diagram of an embodiment of a method for estimating the air discharge temperature of a heater-core of an HVAC system according to the invention.

FIG. 1 shows a block diagram of a first embodiment of a method for estimating an heater-core air discharge temperature. The heater-core is employed in an HVAC system for an automotive application. The block diagram comprises blocks A, B, D, and E with different functions concerning the above method. Their functions can be implemented in software, i.e., in a computer program performing the functions and the entire method according to the invention. The functions will now be explained in detail.

Block A, reference numeral 14, performs a coolant mass flow calculation which is based on the following two parameters: the speed 10 and the type 12 of the engine, which comprises the coolant. Since these two parameters 10 and 12 affect the heater-core effectiveness, they can be used as a basis for the estimation performed by the above method. The result of the calculation is the coolant mass flow through the heater-core 16, which is forwarded to block B, reference numeral 20.

Block B represents the heater-core efficiency model. Block B performs a heater-core heat exchange effectiveness calculation, which is based on the coolant mass flow through the heater-core 16 and an air flow through the heater-core 18. The air flow through the heater-core depends on the speed of the vehicle, which comprises the HVAC system, the speed of an heater fan, the position of blend doors of the HVAC system, and/or similar parameters of the HVAC system. The consideration of the air flow through the heater-core increases the accuracy of the estimation performed by the above method. Block B generates as a result of the calculation a heater-core heat exchange effectiveness $\epsilon$ 22. This result is forwarded to Block E, reference numeral 32.

Block E performs a heater-core air discharge temperature estimation and generates the estimated heater-ore air discharge temperature 34 as result. The estimated heater-core air discharge temperature 34 can then be used by a control device of the HVAC system for controlling blend door positions in order to precisely controlling the air discharge temperature of the entire HVAC system. In order to perform an accurate calculation, block E receives three values: the heater-core heat exchange effectiveness 22 from block B, an air discharge temperature 26 of an evaporator which is part of the HVAC system, and an initial temperature differential 30. The last signal or value 30 is generated by block D, reference numeral 28.

Block D performs a calculation of the initial temperature differential 30 between the evaporator air discharge temperature 26 and the temperature of the coolant 24 of the engine. This calculation can be performed by subtracting the value of the evaporator air discharge temperature 26 from the value of the coolant temperature 24. Preferably, in a hardware implementation of the method, the values or signals 24 and 26 received from block D are in digital format. Then, the calculation can be performed at low cost by digital processing means.

Referring back to block E, the heater-core air discharge temperature 34 is calculated by multiplying the initial temperature differential 30 with the heater-core heat exchange effectiveness $\epsilon$ 22 and adding the product to the evaporator air discharge temperature 26.

Figure 2:
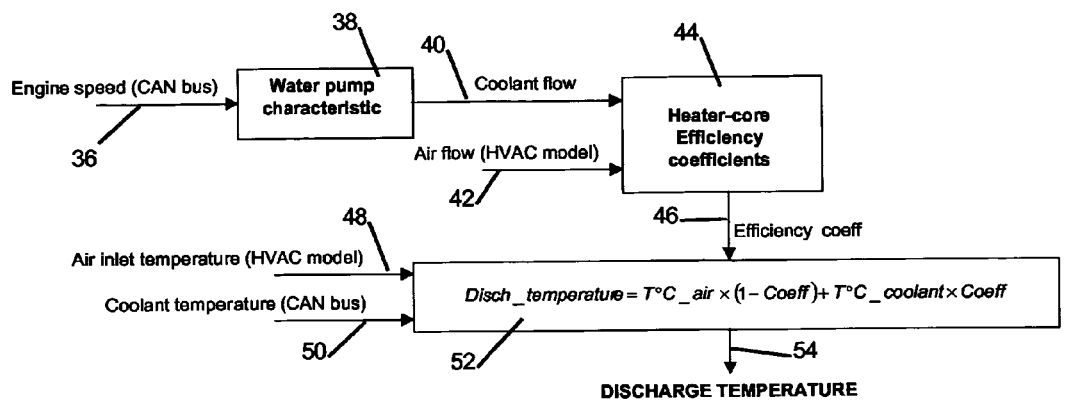
FIG. 2 shows a block diagram of an embodiment of a device for estimating an air discharge temperature of an heater-core of an HVAC system according to the invention.
Figure 3:
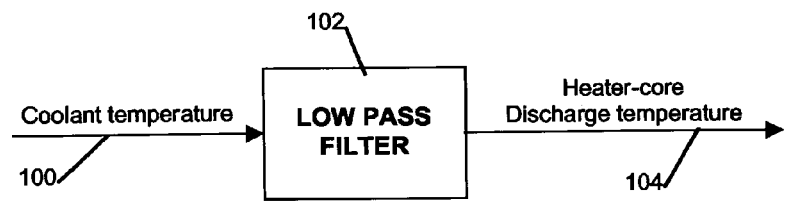
FIG. 3 shows a prior art device for estimating the heater-core air discharge temperature.

FIG. 2 shows an embodiment of a device according to the invention. According to this embodiment of the device, the estimation of the heater-core air discharge temperature 54 slightly differs from the method of FIG. 1, since an air inlet temperature is used for the estimation. The air inlet temperature depends on the temperature exterior to the vehicle in which the device is employed, and if necessary on the intensity of sunshine, which heats the air flowing from external into the vehicle.

The device comprises first calculation means 44 adapted to calculate a heat exchanger efficiency coefficient 46 based on a set of actual operating parameters. The set of actual operating parameters may e.g. comprise an air flow signal 42 from the HVAC, i.e. a signal indicative of the mass of air flowing through the heat exchanger, and/or a coolant flow signal 40. The coolant flow signal 40 may be generated by a second calculation means 38, which is connected with a CAN bus (not shown) to receive an engine speed signal 36 over the CAN bus. The second calculation means maps an engine speed signal 36 from the CAN bus with a function of the characteristic of a water pump of the engine into the coolant flow signal 40.

The coolant flow signal 40 is then processed together with the air flow signal 42 by the fourth calculation means 44 in order to obtain an heater-core heat exchange effectiveness signal 46. This signal is then processed by fourth calculation means 52, which further process an air inlet temperature signal 48 from the HVAC module and a coolant temperature signal 50 from the CAN bus. The calculation performed by the fifth calculation means 52 is expressed by the following formula:

$$\text{Disch\_temperature} = T°C.\_air*(1-\text{Coeff}) + T°C.\_coolant*\text{Coeff}$$

wherein $T°C.\_air$ is the air inlet temperature; $T°C.\_coolant$ is the coolant temperature; Coeff are coefficients describing the heater-core heat exchange effectiveness and are contained in the heater-core heat exchange effectiveness signal 46; Disch_temperature is the estimated heater-core air discharge temperature.

The above mentioned calculation means 38, 44, and 52 can be implemented by a computer program stored in memory means and processed by processing means of the HVAC system employing the device. The processing means can be a microprocessor, a microcontroller, or hardware dedicated for these calculations. In the last case, the processing means can be adapted to execute the computer program which is adapted to implement the device for estimating the heater-core air discharge temperature.

The performed calculations for the estimation do not require increased processing capabilities. Therefore, a standard microprocessor or microcontroller typically used for automotive applications can be employed. Further, the precision of the estimation according to the invention is comparable to a detection of the heater-core air discharge temperature by a sensor, as known from the prior art.

The invention proposes a model based approach for estimating an heater-core air discharge temperature of an HVAC system. According to the invention, the model processes data of the heater-core, particularly a coolant mass flow and an air flow through the heater-core. This data is suitable to generate a accurate estimation of the heater-core air discharge temperature at low costs.

The invention claimed is:

1. A method for estimating an actual temperature of air discharged from a heat exchanger of an HVAC system, comprising the steps of:
    calculating a heat exchanger efficiency based on a first set of actual operating parameters of said HVAC system; and
    calculating estimate of said actual temperature of air discharged from said heat exchanger based on the calculated heat exchanger efficiency and a second set of sctual operating parameters of said HVAC system;
    wherein said HVAC system includes an evaporator for conditioning inlet air and a coolant flowing through said heat exchanger further conditions air discharged from said evaporator, said method including the step of:
    calculating estimate of said actual temperature of air discharged from said heat exchanger based on the calculated heat exchanger efficiency, a temperature of said coolant, and a difference between the temperature of the coolant and a temperature of the air discharged from said evaporator.

* * * * *